United States Patent [19]

Albertinetti et al.

[11] 4,248,504
[45] Feb. 3, 1981

[54] PIEZOELECTRIC WAVEFRONT MODULATOR

[75] Inventors: Nedo P. Albertinetti, Canton; Ralph E. Aldrich, Acton, both of Mass.

[73] Assignee: Itek Corporation, Lexington, Mass.

[21] Appl. No.: 967,651

[22] Filed: Dec. 8, 1978

[51] Int. Cl.³ .................................................. G02F 1/03
[52] U.S. Cl. .................................................. 350/360
[58] Field of Search ............... 350/353, 355, 356, 359, 350/360

[56] References Cited

U.S. PATENT DOCUMENTS

| | | | |
|---|---|---|---|
| 3,746,785 | 7/1973 | Goodrich | 350/360 |
| 3,904,274 | 9/1975 | Feinleib et al. | 350/360 |
| 4,016,415 | 4/1977 | O'Meara | 350/360 |

Primary Examiner—William L. Sikes
Attorney, Agent, or Firm—Homer O. Blair; Robert L. Nathans; Gerald H. Glanzman

[57] ABSTRACT

A piezoelectric wavefront modulator employs a plurality of widely-separated posts, which are formed upon the upper portion of a monolithic piezoelectric medium and are affixed to the lower portion of a flexible mirror. The posts extend from the top surface of the piezoelectric medium a sufficient distance, so that the mirror floats. The posts are surrounded by moats formed within the medium, which are configured to produce a highly sensitive device, wherein the post mirror actuators are substantially electromechanically isolated from each other, but not from the piezoelectric material adjacent the moat.

4 Claims, 2 Drawing Figures

PIEZOELECTRIC WAVEFRONT MODULATOR

TECHNICAL FIELD

This invention relates to the field of modulating wavefronts of light.

BACKGROUND ART

Early wavefront phase modulators employ a number of discrete drivers, such as electromechanical and piezoelectric transducers. U.S. Pat. No. 3,742,234 to Laakmann discloses various device of this type. FIGS. 5-7 illustrate stacks of piezoelectric elements, which are deformed by applying various voltages thereto, to in turn, cause deformation of a mirror. The systems constructed in accordance with the teachings of this patent are stable to only one wavelength of visible light and are incapable of correcting fractions of wavelengths or electromagnetic radiation having shorter wavelengths than those of visible light. Another problem with these devices is that the elements in each stack are formed from various stacks of materials having parameters which vary with respect to each other. For example, the ages of the materials from stack to stack may vary so that the response characteristics of the various transducers will vary with respect to each other. This disadvantage interferes with matching the response characteristics or inflection functions of a particular mirror with those of other mirrors in a system. In contrast, the Feinleib et. al. U.S. Pat. No. 3,904,274, incorporated by reference herein, teaches monolithic devices, which are far simpler to fabricate and are far more stable. Additionally, they have uniformity of the piezoelectric coefficient from point to point, since the material is formed from one wafer. Their stability produces far more accurate control, in contrast with the discrete actuators of the '234 patent. The devices of Feinleib have considerable lateral or cross coupling, that is, motion at one portion of the array is not isolated, and produces considerable motion in adjacent portions of the array due to cross coupling within the piezoelectric material itself and via the mirror being bonded to large areas of the piezoelectric material. The sensitivity of the Feinleib devices was found to be in the neighborhood of two to three angstroms per volt, and it is an object of the present invention to preserve the advantages of the monolithic structures of Feinleib mentioned hereinabove, and yet, sharply increase sensitivity.

DISCLOSURE OF INVENTION

SUMMARY OF THE INVENTION

In accordance with preferred embodiments of the present invention, posts are employed to directly actuate the mirror, which is separated from the substrate, such posts being surrounded by a moat, and thus in turn, by a ring of piezoelectric material, which is integral with the monolithic substrate. These posts could be metallic or could be composed of piezoelectric material, and in the latter preferred embodiment, the units may be formed by core drilling to produce the posts and moat surrounding the post. The result is that the post actuators are electromechanically isolated from each other, but not from the surrounding piezoelectric material, that is, as the posts expand and contract, the adjacent piezoelectric material also expands and contracts. The result is that the mirror in the present invention floats, unlike the Feinleib devices. In accordance with the present invention, the mirror glass is bent more and the piezoelectric material is bent less, and a principal advantage is that the sensitivity is at least doubled to about seven angstroms per volt. Additionally, in the Feinleib devices, the distance between the actuator center lines must be less than the piezoelectric plate thickness or else the piezoelectric substrate will bend; 7 millimeters was the maximum separation in Feinleib, whereas the spacing between actuators in the present invention is a minimum of 10 millimeters and may be made considerably larger. Thus, particularly in the case of large optical elements, the number of actuators may be considerably reduced to thereby reduce manufacturing costs, along with the electronic driver elements required.

DETAILED DESCRIPTION

Reference may first be made to the above-mentioned Feinleib et. al. U.S. Pat. No. 3,904,274, assigned to the assignee of the present invention. Various materials and typical component dimensions are set forth therein.

In FIG. 1, a monolithic piezoelectric body 1 has a lower portion 2, which consists of a metallic coating, which functions as an electrical ground plane. This lower portion is also affixed to mechanical ground 3. In the most preferred embodiment, posts 4 are formed by core drilling into the monolithic piezoelectric body 1. Terminal portions 6 are bonded to deformable glass mirror 7 as shown. The core drilling produces moats 8, which surround posts 4. Terminal portions 6 are dip coated to form metallic electrodes 9 upon the posts as shown. Electrical conductors 11 are affixed to the coated electrodes 9 and pass through holes drilled through the body 1. These conductors, of course, are electrically isolated from the electrical ground plane 2. In FIG. 2, the moats 8 are shown surrounding the posts 4, which in the plan view, are affixed to the underside of the deformable glass mirror 7.

It has been found that the sensitivity of the device may be increased by increasing the moat depth to decrease the dimension t which is the distance from the bottom of the moat to the bottom of portion 2 of body 1. In an embodiment constructed by the inventors, t was about 2 millimeters and the applied voltages was in the neighborhood of 2 kilovolts; t in any case, should be less than $\frac{1}{2}$ of T, the thickness of the body 1. However, the reduction in t is limited by the breakdown voltage of the material. As the moat depth increases, the sensitivity increases and the isolation between actuator posts is very substantial so that the mirror, which is displaced from the upper surface of body 1, "floats", in contrast with the Feinleib et. al. devices. The diameters of the posts and their relatively wide separation produces the "float" of the mirror, such that the posts are affixed to areas of the mirror which are a small percentage of the total area. Embodiments of the invention were constructed having post diameters of about 4 millimeters and most widths of about 1.5 millimeters. In the Feinleib et. al. devices, the actuator separation had to be made less than the thickness of the piezoelectric body, whereas the present invention may be practiced by separating the posts considerable distances, typically 1 centimeter or more, thereby to reduce the driver electronics, electrical connections, and thus, the manufacturing costs. As illustrated, d is the distance between centers of the posts as illustrated in FIG. 2. In an embodiment constructed by the inventors, d was about 1 centimeter, t was about 2 millimeters and T was 13 millimeters. The mirror thickness should typically be in the neighborhood of about 1-3 millimeters and should be made of a material having a thermal coefficient of expansion in the neighborhood of the coefficient of expansion of body 1. The mirror could also be metallic, providing that electrical insulators are bonded between the terminal post portions and the underside of the mirror.

The invention may also be practiced by drilling holes in body 1 having the diameter of the moats and affixing solid metallic posts to the bottom portions of the drilled holes. However, the above-mentioned core drilling and dip coating steps are preferred. The sensitivity of embodiments constructed by the inventors, that is, the degree of mirror displacement per unit of applied voltage, was considerably greater than the sensitivity of the devices previously constructed in accordance with the teachings of Feinleib et. al. Sensitivities of seven angstroms per volt were obtained, in contrast with sensitivities of around two to three angstroms per volt obtained by the Feinleib et. al. devices.

BEST MODE FOR CARRYING OUT THE INVENTION

Figure 1:
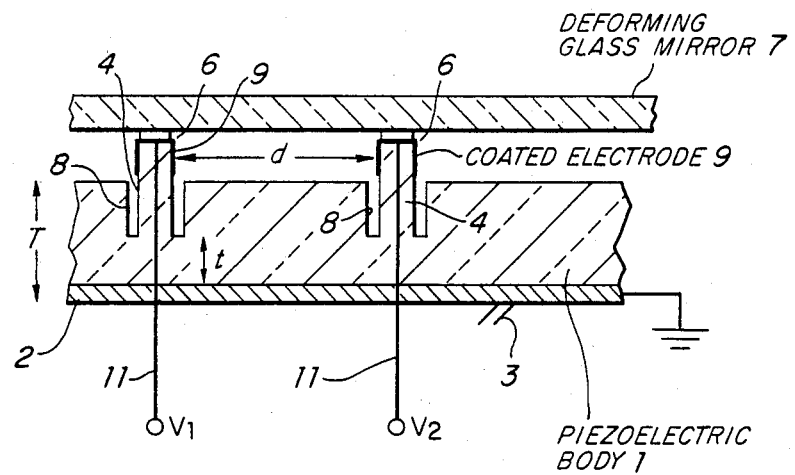
FIG. 1 illustrates a side sectional view of a preferred embodiment of the invention.
Figure 2:
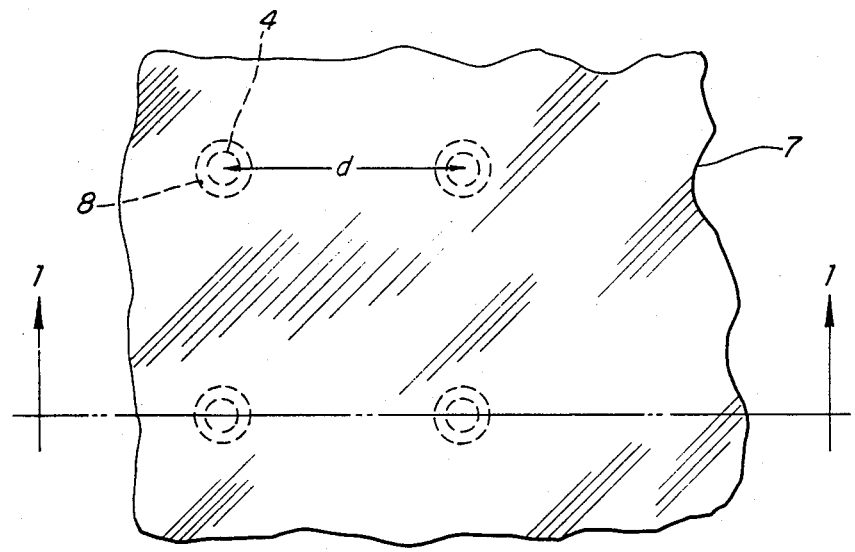
FIG. 2 illustrates a top view of a preferred embodiment of the invention.

See FIGS. 1 and 2 and the related descriptions.

INDUSTRIAL APPLICABILITY

The invention may be used to correct dynamic distortion in optical images such as those viewed by telescopes through atmospheric turbulence.

It should be understood that other components and configurations may be substituted for those described in order to practice the invention, and the invention is to be limited only by the permissable scope of the following claims. References are made in the claims to the numbered components in the described embodiments, and it should be understood that the claims are not to be restricted to such embodiments as the numbers are employed in the claims as merely exemplary of the nature of the claim means.

We claim:

1. In a piezoelectric wavefront modulator, comprising:
   a. a mirror (7);
   b. a monolithic piezoelectric medium (1) which undergoes dimensional changes in response to an electric field impressed thereacross;
   c. means for providing said piezoelectric medium with a plurality of discretely electrically-addressable locations (4, 9);
   d. means for addressing each discretely electrically-addressable location with a variable strength voltage (11), the resulting field being sufficient at each location to cause the piezoelectric medium to undergo deformation which is capable of correcting distortion in a wavefront striking said mirror; the improvement characterized by:
   e. a plurality of mirror actuators at said electrically-addressable locations affixed to said monolithic piezoelectric medium, each of which comprises:
      a plurality of parts (4) coupled to said mirror and said monolithic piezoelectric medium, said posts extending from said monolithic piezoelectric medium a sufficient distance to produce complete separation of said mirror with respect to major portions of said monolithic medium, said posts being coupled to means (8) for substantially electromechanically isolating each post from the other posts, but not from the piezoelectric material adjacent said posts.

2. The combination as set forth in claim 1, wherein said posts are affixed to areas of said mirror which are a small percentage of the total area thereof.

3. In a piezoelectric wavefront modulator, comprising:
   a. a mirror (7);
   b. a monolithic piezoelectric medium (1) which undergoes dimensional changes in response to an electric field impressed thereacross;
   c. means for providing said piezoelectric medium with a plurality of discretely electrically-addressable locations (4, 9);
   d. means for addressing each discretely electrically-addressable location with a variable strength voltage (11), the resulting field being sufficient at each location to cause the piezoelectric medium to undergo deformation which is capable of correcting distortion in a wavefront striking said mirror; the improvement characterized by:
   e. a plurality of mirror actuators at said electrically-addressable locations affixed to said monolithic piezoelectric medium, each of which comprises:
      a plurality of posts (4) coupled to said mirror and said monolithic piezoelectric medium, said posts extending from said monolithic piezoelectric medium a sufficient distance to produce complete separation of said mirror with respect to major portions of said monolithic medium, said posts being surrounded by a moat (8) for substantially electromechanically isolating each post from the other posts but not from the piezoelectric material adjacent said moat.

4. The combination as set forth in claim 3, wherein said posts are affixed to areas of said mirror which are a small percentage of the total area thereof.

* * * * *